April 1, 1969  F. BEUCHLE  3,435,924
DISK-BRAKE SYSTEM WITH FLOATING BRAKE DISK
Filed March 13, 1967  Sheet 1 of 2

INVENTOR.
FRIEDRICH BEUCHLE
BY Karl F. Ross
ATTORNEY

United States Patent Office 3,435,924
Patented Apr. 1, 1969

3,435,924
DISK-BRAKE SYSTEM WITH FLOATING
BRAKE DISK
Friedrich Beuchle, Frankfurt am Main, Germany, assignor to Alfred Teves K.G., Frankfurt am Main, Germany, a corporation of Germany
Filed Mar. 13, 1967, Ser. No. 622,718
Claims priority, application Germany, Apr. 30, 1966, T 31,071
Int. Cl. F16d 65/10, 11/00, 13/60
U.S. Cl. 188—218
2 Claims

ABSTRACT OF THE DISCLOSURE

A brake disc for a disk-brake system which has a hub splined to the disk shaft; a relatively thin web connecting the hub to a relatively thick annular brake ring whose faces are engaged by the brakeshoes, and a plurality of circular rows of angular equispaced throughgoing sectors, the rows being coaxial with one another and angularly staggered. The splines and grooves have flanks which lie parallel to the respective radial plane through the spline and groove.

---

My present invention relates to a disk-brake system with a floating brake disk and, more particularly, to a disk-brake arrangement wherein the disk is axially shiftable upon its shape and is formed with a pair of braking faces with which corresponding brakeshoes are frictionally engageable.

In my U.S. Patent 3,295,640, issued Jan. 3, 1967, I describe and claim a brake disk for a disk-type brake having a pair of brake members (e.g. brakeshoes) disposed on opposite sides of the disk and engageable therewith for braking rotation of the disk with respect to these members. The disk is shiftable with respect to a central support attached to a shaft, i.e. the wheel shaft of an automotive vehicle, via a multiplicity of teeth disposed along an internal surface of an annulus forming the braking faces; the hub portion has teeth which are complementary to those of the braking portion and engage the latter with freedom of at least limited axial movement of the braking surfaces. Disk brakes of this type have the advantage that the brake disk is always located centrally between the brakeshoes in spite of the fact that the yoke in which the brakeshoes are mounted is fixed to a brake support.

It should be understood that earlier systems involving the use of axially shiftable disks in disk-brake systems having brakeshoes flanking the disk have proved to be ineffective or undesirable because of the requirement that the disk be guided axially upon its splined shaft with a minimum of play to prevent canting of the disk during braking operations. This limitation of the amount of play creates technological problems because in the absence of a certain play even the slightest unbalanced axial pressure on the disk prevents the disk from moving along its splined shaft and causes binding. Further, the absence of this minimum play creates difficulties with heated brake disks. Thus the brake disk becomes warm or even relatively hot upon frictional engagement of the brakeshoes therewith and, upon transfer of heat to the hub of the disk, a binding because of thermal dimension change is observed. Thus, on the one hand, it is desirable to guide the disk axially with a minimum of play while, on the other hand, the absence of at least a certain amount of dimensional tolerance or play is effective, even during normal operations of the brake, to impede axial movement of the disk and cause binding of the brake.

It is, therefore, the principal object of the present invention to provide an improved disk-brake system having a "floating" or axially shiftable brake disk which can be mounted for movement with minimum play, but is not detrimentally affected by unbalanced axial forces or heating induced by frictional action.

A further object of my invention is to provide a brake disk of the floating or axially shiftable type which is free from the tendency to bind or "lock" characterized earlier axially shiftable disks in disk-brake systems.

I have found that these objects, and others which will become apparent hereinafter, can be attained by providing, in a disk-brake installation having a pair of brakeshoes respectively engageable with opposite annular brake surfaces of a brake disk, an improved disk construction in which the brake disk comprises an annular outer braking portion, a hub portion provided with angularly spaced formations engageable with complementary formations of a shaft or support sleeve of hub so as to permit axial movement of the disk with a minimum of play, and an annular web connecting the hub portion with the braking portion and unitarily formed therewith, i.e. cast or turned in a single piece with the hub portion and the braking portion.

According to an important feature of this invention, the web, whose thickness is a minor fraction of the thickness of the braking portion or ring (e.g. one half to one quarter the thickness of the braking annulus), is formed with one or more rows of throughgoing slots centered on the axis of rotation of the disk and angularly spaced around the web concentrically with the disk. The angular extent of each of these circular-sector slots is advantageously several times greater than the angular extent of the solid web between them and, moreover, greater than the radial distance of the rows from one another. I have found that the width of these slots may likewise be approximately equal to or slightly less than the width of the solid material between the slots of the coaxial rows when a plurality of such rows are provided, the open spaced formed by the slots being in axial projection substantially equal to or greater than the solid material between the slots. Furthermore, adjacent rows of these sectors are staggered angularly so that the spaces in between the slots are radially interrupted-by slots of other rows.

According to a further feature of the invention, the brake disk is mounted on the shaft or hub with a multiplicity of angularly spaced splines or ridges which are received without significant play in corresponding grooves of the mating members, their ridges or splines having flanks which are parallel to the corresponding radial median plane through the groove or spline. This construction of the keying means has been found to be highly advantageous in preventing wear and stress upon the axially movable interengaged parts and to limit binding of the brake disk.

The construction of the brake disk described above appears to prevent transmission of heat from the relatively massive braking annulus to the hub portion of the disk, with the sectoral slots forming heat barriers and additional heat-dissipating surfaces.

The above and other objects, features and advantages of the present invention will become more readily apparent from the following description, reference being made to the accompanying drawing in which.

Figure 3:
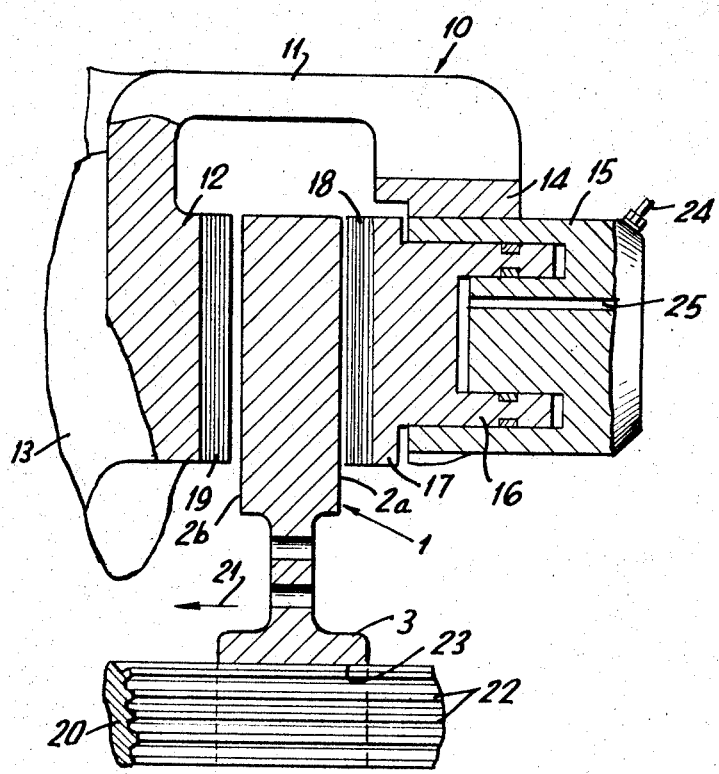
FIG. 3 is an axial cross-sectional view through a disk brake embodying the disk of FIGS. 1 and 2.

Referring first to FIG. 3, it can be seen that the disk-brake system 10 can include a yoke 11 extending around the periphery of the disk 1 and having a flange 12 of the yoke 11 secured to an axle housing or other support structure 13 of an automotive vehicle. While the brake is described in its application as a wheel brake of the motor vehicle, it will be understood that disk brakes of this character are also suitable for terminating rotary motion between moving parts of all types and in conjunction with machine elements and mechanisms of other constructions. The other flange 14 of the yoke carries a brake cylinder 15 whose piston 16 is provided with a brakeshoe 17 and a brake lining 18 confronting one flank or braking face 2a of the disk. The flange 12 has a corresponding brake lining 19 which is coextensive with the lining 18 and confronts the other braking face 2b of the disk. The disk 1 is axially movable with respect to a shaft 20 as represented by the arrow 21 but is rotatably entrained therewith via a mating means consisting of angularly spaced splines 22 on the shaft and a grooved portion 23 on the hub 3 of the disk. Thus, upon actuation of the brake 10 while the disk 1 is rotated relatively to the support 13 by the shaft 2, hydraulic fluid is introduced into the cylinder 15 via fitting 24 and a duct 25 from the master brake cylinder. Hydraulic fluid urges the piston 16 to the left until the brake shoe 18 frictionally engages the braking face 2a of the disk 1; the latter is then shifted in the direction of arrow 21 until its braking face 2b engages the brake lining 19 through a distance corresponding substantially to the brake play. As the disk 1 is sandwiched between the brakeshoes 18 and 19 and axial pressure is applied by the latter, the disk 1 is frictionally slowed and brought to a standstill.

Figure 1:
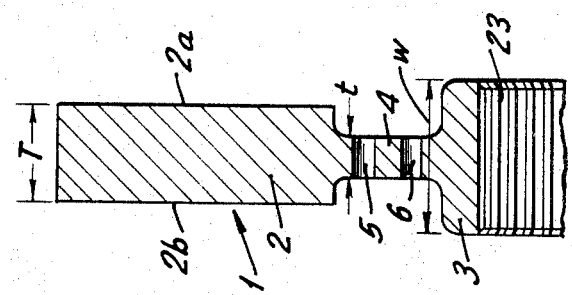
FIG. 1 is a fragmentary sectional view of the brake disk according to this invention.

According to the principles of this invention, the brake disk 1 (FIGS. 1 and 2) includes a relatively massive (thick) braking annulus or ring, forming the braking portion 2, which is provided with the faces 2a and 2b. The annular braking portion 2 is connected via a relatively thin web 4 to a hub or foot portion 3 which is provided with the grooves 23 of the spline structure 22, 23. The thickness of the web 4 is advantageously a fraction of the thickness T of the braking portion 2 and of the width W of the hub 3. The web 4 is formed with a labyrinth-type obstruction to heat transfer from the braking portion 2 to the hub 3, this labyrinth obstruction taking the form of a plurality of coaxial rows of concentric sectoral slots 5, 6 which are angularly staggered from row to row so that the solid portion 5' between the slots 5 of an outer row is radially aligned with a slot 6 of the next, innermost row while the solid portion 6' of the latter is offset angularly by half the angular extent of the sectoral slot 6 from the solid portion 5'. The angular extent $\alpha$, measured in degrees or radians, of the sectoral slot 6 is several times greater than the angular extent $\beta$ of the corresponding space 6' while the widths $r$ of the slots 6 are approximately equal to the solid widths $w$ between the rows of slots. For the most part, therefore, the open area of the web 4 will approach the solid area thereof or be somewhat greater. Best results are obtained when the slots have a width between 4 and 7 times greater (in angular extent) than the spaces 5' and 6' between them.

Figure 2:
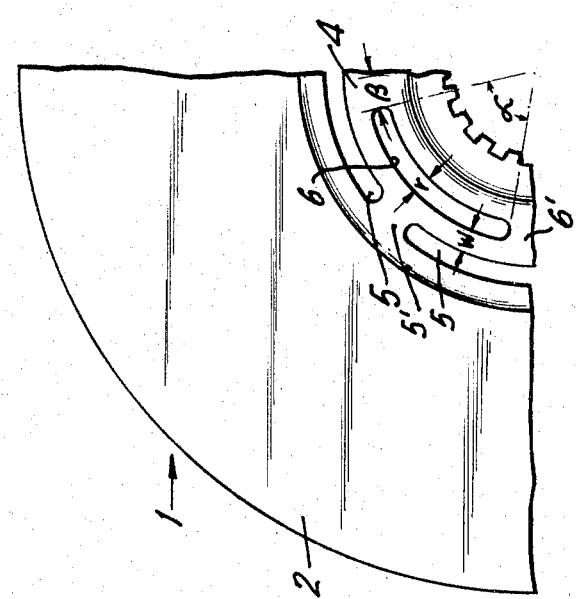
FIG. 2 is an elevational view of a portion of this disk.

It has been observed that, with a dimensional relationship of the aforedescribed type and a minimum of two coaxial angularly staggered rows of sectoral slots as illustrated in FIGS. 2 and 3, the heat-transfer path between the brake portion 2 and the hub 3 is extended so that the heat is dissipated before distortion of the hub occurs. Additionally, the slotted web 4 forms a resilient or elastic connection between the brake annulus 2 and the hub 3 so that slight unbalanced axial pressures during braking do not tend to cause binding of the splined assembly 22, 23. Furthermore, an angular elasticity results and sudden braking actions are absorbed by this elasticity with little danger of damage to the splines.

Figure 4:
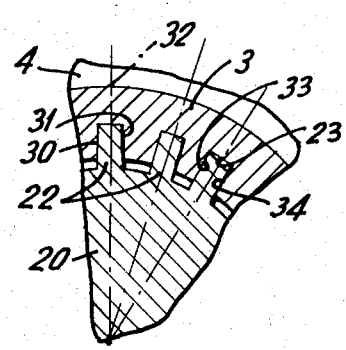
FIG. 4 is a cross-sectional detail view drawn to an enlarged scale, illustrating the coupling means between the shaft and the hub of the disk.

In FIG. 4, I show the spline construction of this system, the shaft 20 being provided with angularly equispaced axially extending splines 22 whose flanks 30 and 31 are parallel to the respective radial median plane 32 through the spline. Similarly, the flanks 33 and 34 of the complementary grooves 23 of the hub 3 lie parallel to the respective radial planes 32.

While the brake shoes of this assembly are shown to be provided with linings in the system of FIG. 3, it will be understood that the linings can be provided equally or more effectivey upon the braking faces 2a, and 2b of the disk which, in this case, will have a configuration and construction as set forth in my commonly assigned recently issued patent identified above.

I claim:
1. In a disk-brake system having a brake disk with two surfaces rotatable relatively to and axially engageable with a pair of annular braking faces on a pair of brakeshoes and wherein the brake disk is axially shiftable upon a shaft but rotatably entrained therewith, the improvement wherein:

said brake disk is formed with an outer annular brake portion bearing said surfaces, a hub keyed to said shaft, and an annular web connecting said brake portion with said hub, said web being axially recessed from both said surfaces and being provided with a plurality of circular coaxial rows of angularly equispaced throughgoing sectoral slots with the slots of successive rows angularly offset from one another, each of said slots having an angular extent at least several times greater than the angular extent of the solid web portion between adjacent slots of each of said rows, said web having a thickness equal to a minor fraction of the thickness of said brake portion, and said slots having widths approximately equal to the width of the solid web between the rows of slots.

2. The improvement defined in claim 1 wherein said hub is mounted on said shaft by mating splines and grooves formed therein, said splines and grooves being of complementary configuration with respective flanks parallel to the respective radial plane through the mated groove and spline.

References Cited

UNITED STATES PATENTS

| 2,443,688 | 6/1948 | McFarland. |
| 2,905,279 | 9/1959 | Moyer _____ 192—107 X |
| 2,989,161 | 6/1961 | Diebold. |
| 3,301,356 | 1/1967 | Pompa. |

FOREIGN PATENTS

| 993,466 | 7/1951 | France. |
| 1,211,041 | 11/1963 | Germany. |

GEORGE E. A. HALVOSA, *Primary Examiner.*

U.S. Cl. X.R.

192—107